United States Patent [19]

Wszolek

[11] Patent Number: 5,737,544
[45] Date of Patent: Apr. 7, 1998

[54] LINK SYSTEM CONTROLLER INTERFACE LINKING A PCI BUS TO MULTIPLE OTHER BUSES

[75] Inventor: Philip Wszolek, Phoenix, Ariz.

[73] Assignee: VLSI Technology, Inc., San Jose, Calif.

[21] Appl. No.: 628,969

[22] Filed: Apr. 8, 1996

[51] Int. Cl.$^6$ ................................................. G06F 13/00
[52] U.S. Cl. ................................................. 395/287
[58] Field of Search ................................. 395/287, 280, 395/306, 309, 308

[56] References Cited

U.S. PATENT DOCUMENTS

| | | | |
|---|---|---|---|
| 4,669,044 | 5/1987 | Houser et al. | 395/200.08 |
| 5,038,276 | 8/1991 | Bozzetti et al. | 395/293 |
| 5,333,301 | 7/1994 | Cheney et al. | 395/575 |
| 5,483,642 | 1/1996 | Okazawa et al. | 395/306 |
| 5,553,265 | 9/1996 | Abato et al. | 395/470 |
| 5,557,758 | 9/1996 | Bland et al. | 395/308 |
| 5,574,921 | 11/1996 | Curran | 395/750 |
| 5,621,902 | 4/1997 | Cases et al. | 395/309 |

Primary Examiner—Ayaz R. Sheikh
Assistant Examiner—David A. Wiley
Attorney, Agent, or Firm—LaValle D. Ptak

[57] ABSTRACT

A link system controller is interposed between a PCI bus and the CPU data bus and memory data bus of a personal computer system to ensure that the transfer of data from the PCI bus to the CPU data bus occurs on different clock signals from the transfer of data from the PCI bus to the memory data bus. This is accomplished by an authorizing circuit, which alternately enables a CPU bus interface controller and a memory data bus controller in response to alternating clock signals. This prevents simultaneous switching of the devices on both the CPU data bus and the memory data bus, to reduce the generation of noise below an acceptable threshold; so that the operation of the IC system device is not impaired.

8 Claims, 1 Drawing Sheet

LINK SYSTEM CONTROLLER INTERFACE LINKING A PCI BUS TO MULTIPLE OTHER BUSES

RELATED APPLICATION

This application is related to application, Ser. No. 08/629,011, filed Apr. 18, 1996.

BACKGROUND

Personal computers in widespread use today include various buses for handling data and memory in different parts of the computer system. There is a central processor unit (CPU) data bus, as well as a memory data bus in these systems, for transferring data to and from memory and to and from the CPU of the system. These data buses operate synchronously with the clock of the CPU. In addition, an asynchronous PCI bus is employed to supply signals to each of the other data buses in the system.

Whenever the output drivers of an integrated circuit (IC) device switch, noise is generated on the power and ground buses of the device. As a consequence, the generated noise increases as the number of devices switching simultaneously increases. Situations can arise where the generated noise causes erroneous operation of the devices or other components in the system. A brute force solution is to have a large number of power and ground connections to each IC device. This results in a low enough inductance that the noise generated is maintained at a sufficiently low level to prevent impairment of the operation functionality of the IC device. Obviously, such a solution necessarily is limited, since there is a practical physical limitation on the number of power and ground connections which can be made to the IC device.

For some systems in the past, the problem also has been addressed by designing the bus protocols so that the address bus and the data bus of the system are prevented from switching on the same rising edge of the input clock. Special protocols must be used, however, for such systems.

In systems where information is obtained asynchronously from a PCI bus, it is possible to have both the address bus and the data bus (such as the memory data bus and the CPU data bus) switching simultaneously, thereby creating the possibility of erroneous operation as a result of generated switching noise.

Accordingly, it is desirable to limit the number of output drivers on the IC device which can switch simultaneously, thereby reducing the number of power and ground connections required.

SUMMARY OF THE INVENTION

It is an object of this invention to provide an improved system controller for controlling the transfer of data in a personal computer system.

It is an additional object of this invention to provide an improved link system controller in a computer system for controlling the transfer of data from a PCI bus to a CPU data bus and a memory data bus.

It is another object of this invention to provide a system controller in a computer system employing an arbitrator for causing the switching signals applied to the CPU data bus and the memory data bus of a computer to occur on different clock edges; so that no simultaneous switching on both buses occurs.

In accordance with a preferred embodiment of the invention, a link system for controlling the transfer of data from a PCI bus to a CPU data bus and a memory data bus includes an interface controller connected between the PCI bus and the CPU data bus and memory data bus. The controller operates to permit the simultaneous writing of data to the memory data bus from the PCI bus and to the CPU data bus. The system, however, operates to offset the data transfer to the memory data bus and to the CPU data bus; so that simultaneous switching on these buses does not occur.

DETAILED DESCRIPTION

Figure 1:
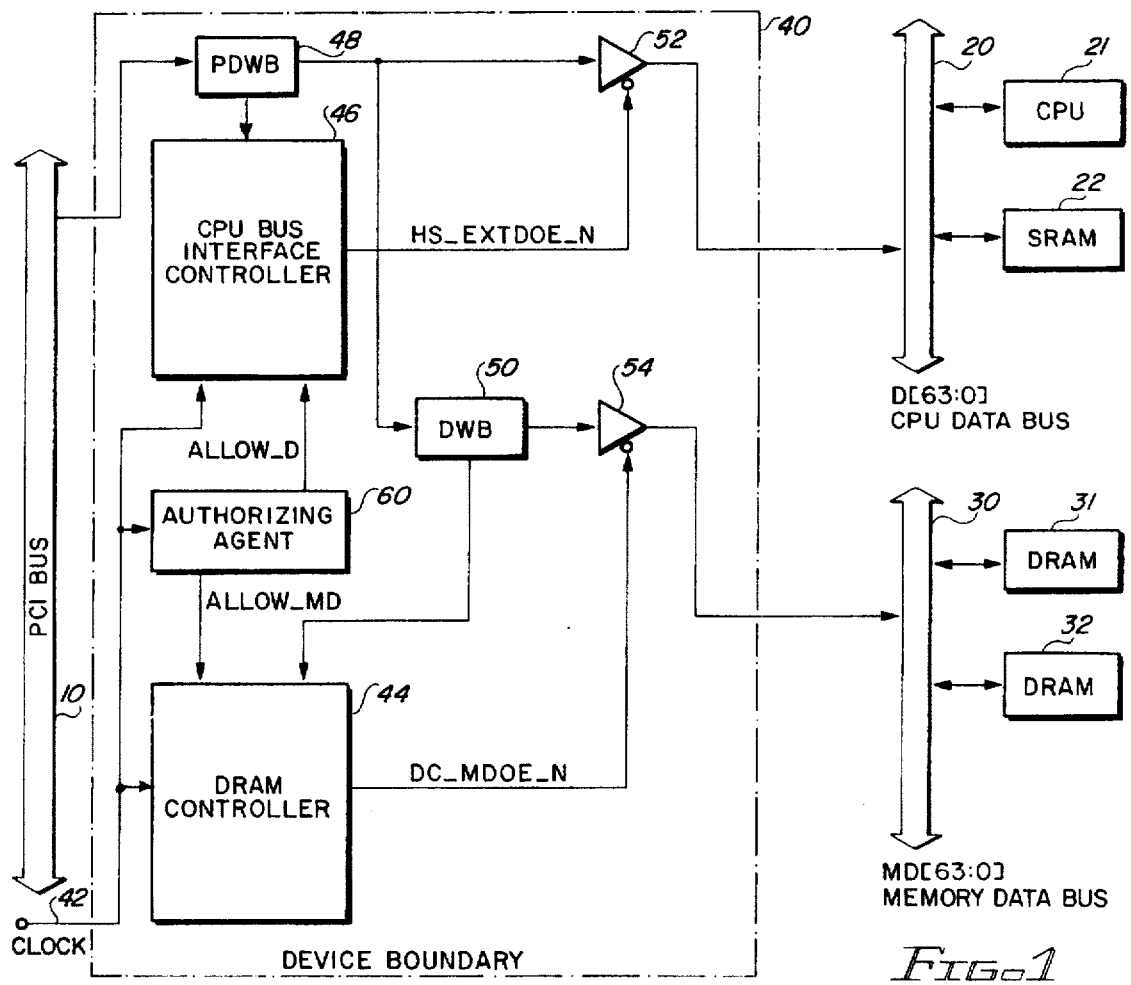
FIG. 1 is a block diagram of a preferred embodiment of the invention.

Reference now should be made to the drawing, in which FIG. 1 is a block diagram of a link system controller for controlling the transfer of data from an asynchronous PCI bus 10 to a CPU data bus 20 and to a DRAM memory data bus 30. As illustrated in FIG. 1, both the CPU data bus 20 and the memory data bus 30 are 64 bit buses. The CPU data bus 20 is identified as D[63:0] and the memory data bus 30 is identified as MD[63:0].

As shown in FIG. 1, the data bus 20 transfers data to and from a conventional CPU 21 and also to and from a static RAM memory (SRAM) 22. The memory 22 does not need refreshing, and it is a cache RAM memory of the type widely used with a CPU 21. Other components (not shown) may be connected to the CPU data bus 20 in a conventional manner.

Similarly, the memory data bus 30 is illustrated as having two dynamic random access memory (DRAM) units 31 and 32 attached to it. As is well known, these memories continually need refreshing at periodic intervals; and data is written into and read from these memories in the operation of the system including the CPU 21 and data bus 20 with which they are associated. The transfer of data to and from the buses 20 and 30 is effected on a synchronous basis from a common clock associated with the CPU 21. This is conventional operation; and the details of the system interconnections are not shown as a result.

In addition to the buses 20 and 30, systems of the type shown in FIG. 1 also receive data from a PCI asynchronous bus 10, shown on the left-hand side of FIG. 1. The data which is transferred from the bus 10 is directed to either or both of the buses 20 and 30 and absent some type of control, it is possible for simultaneous data transfer on the 64 leads of both buses 20 and 30 from the PCI bus 10 to take place. This would result in a large number of output drivers on the system IC device switching simultaneously, creating problems of generated noise on the power and ground connections, as described previously.

In order to limit the required number of power and ground connections to the IC device, the link system controller 40 shown in FIG. 1 has been designed to prevent the simultaneous switching of data from the PCI bus 10 to the buses 20 and 30. This is effected by means of a CPU bus interface controller 46 and a DRAM controller 44 in the link system controller system 40. The operation of the controllers 44 and 46 is effected in synchronism with clock signals on a lead 42 from the CPU 21, thereby synchronizing the operation of the circuit 40 with the operation of the devices on the CPU data bus 20 and memory data bus 30.

Whenever data is to be written from the PCI bus 10 into either of the DRAM memories 31 and 32 on the memory data bus 30 or is to be supplied to the CPU data bus 20, the data is supplied to a PCI to DRAM write buffer (PDWB) 48 in the link system controller. This buffer is a standard multi-stage buffer. The signals pass through the buffer 48 and are supplied in parallel to a buffer amplifier 52 and a second DRAM write buffer (DWB) 50. The output of the DRAM write buffer 50, in turn, is supplied to the input of a buffer amplifier 54.

As illustrated in FIG. 1, the buffer amplifiers 52 and 54 both are gated amplifiers; and they are selectively enabled by signals obtained from the CPU bus interface controller 46 and the DRAM controller 44, respectively. Whenever the signal on the enable inputs to the buffers 52 and 54 is high, the respective buffer amplifiers 52 and 54 are disabled or prevented from passing data therethrough. Similarly, whenever the signal applied to the enable inputs of the buffer amplifiers 52 or 54 is low, the respective buffer amplifier is enabled to pass data signals therethrough.

Figure 2:
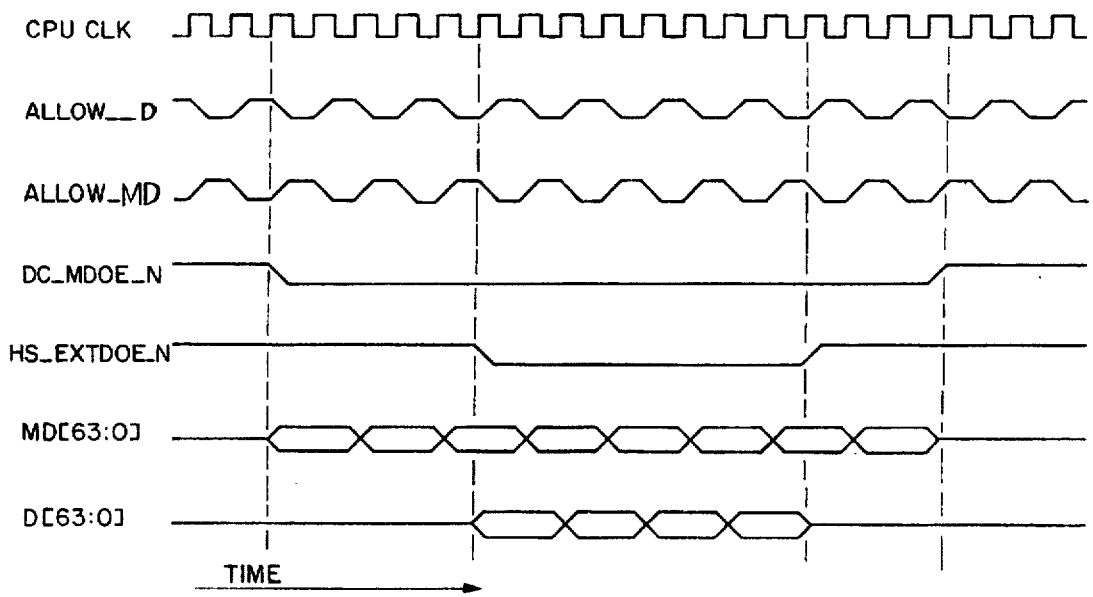
FIG. 2 is timing diagram useful in describing the operation of FIG. 1.

It should be noted that the controllers 44 and 46 are operated in synchronism by means of the CPU clock signals applied over the lead 42. These clock signals are shown in the top waveform of FIG. 2. FIG. 2 also shows the various other waveforms of the signals occurring on correspondingly identified leads in FIG. 1. In addition, control of the operation of the CPU bus interface controller 46 and the DRAM 44 is effected by an authorizing agent circuit 60 operated by the same clock signals applied to the controllers 44 and 46. The authorizing agent 60 essentially functions as a toggle switch, producing switching signals 180° out of phase with one another on the ALLOW_D output to the CPU bus interface controller 46 and on the ALLOW_MD input to the DRAM controller 44. These signals are shown in the correspondingly identified waveforms immediately below the clock waveform in FIG. 2.

The alternating signals ALLOW_D and ALLOW-MD, which are applied, respectively, to the interface controllers 46 and 44, occur on successive cycles of the clock signals (CPU CLK). The function of these "ALLOW" signals is to permit the controllers 44 and 46 only to supply enabling signals to the buffer amplifiers 54 and 52, respectively, when an "ALLOW" signal is supplied to the corresponding controller 44 or 46. This means that the buffer amplifiers 52 and 54 are enabled to pass the asynchronous signals from the PCI bus 10, and supplied to them through the buffers 48 and 50, on alternating cycles of the clock. It should be noted that while the toggle of the "ALLOW" signals from the circuit 60 is described as occurring on every clock signal, other variations, such as the two clocks for ALLOW_MD and one for ALLOW_D, can be used.

For example, as illustrated in FIG. 2, when the positive going waveform for ALLOW-MD occurs and signals are available to be supplied to the memory data bus 30, the "ALLOW-MD" signal permits the enable signal (DC_MDOE_N) from the DRAM controller 44 to go low, thereby enabling the buffer amplifier 54 to pass the signals from the PCI bus supplied to it through the buffer 50 (DWB). This is shown in the waveform MD[63:0] in FIG. 2 and indicates that the signals supplied to the memory data bus MD[63:0] are applied for the duration of the enable signal. Whenever no further write signals to the DRAM memories 31 and 32 are supplied from the PCI bus 10, a signal from the DWB buffer 50 is supplied to the DRAM controller 44 and the enable signal is removed on a corresponding clock pulse from the CPU clock signal applied over the lead 42.

It is possible to have signals appearing on the PCI bus 10 which are to be applied to both the CPU data bus 20 and the memory data bus 30 at the same time. If this occurs, an indication is supplied to the CPU bus interface controller 46 from the DDWB buffer 48; so that on an alternate clock signal, the buffer enable signal HS_EXTDOE-N from the controller 46 is applied to the buffer amplifier 52 to allow it to pass signals through it to the CPU data bus 20 (D[63:0]). This is shown in the bottom waveform of FIG. 2.

From a comparison of the waveforms D[63:0] and MD[63:0] of FIG. 2, it can be seen that the initiation of the information transfer from the PCI bus 10 to the CPU data bus 20 and the memory data bus 30 occurs on different cycles of the CPU clock; so that simultaneous switching of data on the buses 20 and 30 does not occur. This is shown by the offset in the signals D[63:0] and MD[63:0] of FIG. 2. Effectively, this is a system design which designates a time slice within which each interface controller 44 and 46 may change the value on its respective data bus of its external interface. The parameters of the time slices may be made programmable in terms of the number of clocks within any given one of its time slices. As shown in FIG. 2, each time slice covers two clock periods.

An increase in performance over an arbitration method exists because writes can be in progress on both of the interfaces to the buses 20 and 30, simultaneously, allowing both writes to be completed in less time than with arbitration systems where only one write on one of the buses 20 or 30 can take place at any given time. At the same time, by offsetting the initiation of the transfer of write data signals to the buses 20 and 30, switching noise is maintained below a maximum allowable level for the IC with which the system is used.

The foregoing description of the preferred embodiment of the invention is to be considered as illustrative and not as limiting. Various modifications will occur to those skilled in the art for performing substantially the same function, in substantially the same way, to achieve substantially the same result without departing from the true scope of the invention as defined in the appended claims.

What is claimed is:

1. A link system controller in a computer system for controlling the transfer of data from a PCI bus to a CPU data bus and a memory data bus including in combination:

first and second buffers each having a data input coupled with a PCI bus, an enable input for controlling passage of data therethrough, and a data output, with the data output of said first buffer coupled with a CPU data bus, and the data output of said second buffer coupled with a memory data bus;

a CPU bus interface controller having an output connected with the enable input of said first buffer;

a memory bus controller having an output coupled with the enable input of said second buffer;

an authorizing switch circuit having a clock input and first and second outputs coupled with said CPU bus interface controller and said memory data bus controller, respectively, for alternately enabling said CPU bus interface controller and said memory data bus controller in response to clock signals supplied to the clock input of said authorizing switch circuit;

a source of clock signals connected with the clock input of said authorizing switch circuit and said CPU bus interface controller and said memory data bus controller for synchronizing the operation of said controllers and said authorizing switch circuit; and said authorizing switch circuit enabling said CPU bus interface controller for supplying enable signals on the output thereof connected with said first buffer on first predetermined clock signals and enabling said memory data bus controller on second predetermined clock signals different from said first predetermined clock signals to supply enable signals on the output thereof connected with the enable input of said second buffer; so that said first and second buffers are enabled in synchronism with different clock signals to offset the initiation of the transfer of write data signals to said CPU data bus and said memory data bus.

2. The combination according to claim 1 wherein said first and second predetermined clock signals are alternating clock signals.

3. The combination according to claim 2 wherein said enable signals from said CPU bus interface controller and said memory data bus controller have a duration of a predetermined number of clock signals.

4. The combination according to claim 3 further including a third multi-stage buffer connected between said PCI bus and the data input of said first buffer and a fourth multi-stage buffer connected between the output of said first buffer and the data input of said second buffer.

5. The combination according to claim 4 wherein said third multi-stage buffer is coupled with said CPU bus interface controller and said fourth multi-stage buffer is coupled with said memory data bus controller for providing signals to said controllers indicative of the status of data in said third and fourth buffers, respectively, for initiating an enable signal output on the output of said CPU bus interface controller and for initiating an output signal from said memory data bus controller on the output thereof connected with the enable input of said second buffer.

6. The combination according to claim 1 wherein said enable signals from said CPU bus interface controller and said memory data bus controller have a duration of a predetermined number of clock signals.

7. The combination according to claim 1 further including a third multi-stage buffer connected between said PCI bus and the data input of said first buffer and a fourth multi-stage buffer connected between the output of said first buffer and the data input of said second buffer.

8. The combination according to claim 7 wherein said third multi-stage buffer is coupled with said CPU bus interface controller and said fourth multi-stage buffer is coupled with said memory data bus controller for providing signals to said controllers indicative of the status of data in said third and fourth buffers, respectively, for initiating an enable signal output on the output of said CPU bus interface controller and for initiating an output signal from said memory data bus controller on the output thereof connected with the enable input of said second buffer.

* * * * *